(12) United States Patent
Funakoshi et al.

(10) Patent No.: US 11,917,118 B2
(45) Date of Patent: Feb. 27, 2024

(54) INFORMATION PROCESSING APPARATUS AND INFORMATION PROCESSING METHOD

(71) Applicant: SONY GROUP CORPORATION, Tokyo (JP)

(72) Inventors: Ryohei Funakoshi, Tokyo (JP); Masato Akao, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/786,818

(22) PCT Filed: Dec. 17, 2020

(86) PCT No.: PCT/JP2020/047136
§ 371 (c)(1),
(2) Date: Jun. 17, 2022

(87) PCT Pub. No.: WO2021/132013
PCT Pub. Date: Jul. 1, 2021

(65) Prior Publication Data
US 2023/0012510 A1 Jan. 19, 2023

(30) Foreign Application Priority Data
Dec. 27, 2019 (JP) ................................. 2019-238899

(51) Int. Cl.
*H04N 13/125* (2018.01)
*H04N 13/128* (2018.01)
(Continued)

(52) U.S. Cl.
CPC ......... *H04N 13/125* (2018.05); *H04N 13/128* (2018.05); *H04N 13/302* (2018.05); *H04N 13/383* (2018.05)

(58) Field of Classification Search
CPC .. H04N 13/125; H04N 13/128; H04N 13/302; H04N 13/383; H04N 13/366;
(Continued)

(56) References Cited

U.S. PATENT DOCUMENTS

| 11,616,940 B2 * | 3/2023 | Kusafuka | H04N 13/361 |
| | | | 348/53 |
| 2011/0013039 A1 * | 1/2011 | Aisaka | H04N 23/61 |
| | | | 348/222.1 |

(Continued)

FOREIGN PATENT DOCUMENTS

| CN | 102136225 A | 7/2011 |
| CN | 102714749 A | 10/2012 |

(Continued)

OTHER PUBLICATIONS

International Search Report and Written Opinion of PCT Application No. PCT/JP2020/047136, dated Mar. 16, 2021, 13 pages of ISRWO.

*Primary Examiner* — Tung T Vo
(74) *Attorney, Agent, or Firm* — CHIP LAW GROUP (57) ABSTRACT

An information processing apparatus (100) includes: a calculation unit (163) that calculates an index value related to display of stereoscopic image content including a stereoscopic image based on a relative position of a viewer with respect to a position of a display unit (150) that displays the stereoscopic image; and a display control unit (164) that controls display processing performed by the display unit (150) based on the index value calculated by the calculation unit (163).

19 Claims, 7 Drawing Sheets

(51) Int. Cl.
*H04N 13/383* (2018.01)
*H04N 13/302* (2018.01)

(58) Field of Classification Search
CPC .......... G02B 30/00; G06T 15/06; G09G 5/00; G09G 5/02; G09G 5/10; G09G 5/36; G09G 5/38
USPC .......................................................... 348/51
See application file for complete search history.

(56) References Cited

U.S. PATENT DOCUMENTS

| | | | |
|---|---|---|---|
| 2011/0181587 A1 | 7/2011 | Nakamura et al. | |
| 2012/0293640 A1 | 11/2012 | Hirai et al. | |
| 2013/0136337 A1* | 5/2013 | Asente | G06T 19/20 382/154 |
| 2014/0062710 A1* | 3/2014 | Wu | H04N 13/302 340/686.1 |
| 2014/0210705 A1* | 7/2014 | Kim | G06F 3/012 345/156 |
| 2015/0304625 A1* | 10/2015 | Seto | H04N 13/122 348/44 |
| 2015/0341626 A1* | 11/2015 | Kim | H04N 13/366 348/51 |
| 2016/0073097 A1* | 3/2016 | Hamagishi | H04N 13/383 348/59 |
| 2018/0068488 A1* | 3/2018 | Hart | G06T 19/006 |
| 2018/0315362 A1* | 11/2018 | Newton | G09G 3/003 |
| 2022/0214743 A1* | 7/2022 | Dascola | G06F 3/011 |
| 2022/0358724 A1* | 11/2022 | Sugano | G06T 7/73 |

FOREIGN PATENT DOCUMENTS

| | | |
|---|---|---|
| EP | 2348388 A2 | 7/2011 |
| JP | 09-298759 A | 11/1997 |
| JP | 10-042315 A | 2/1998 |
| JP | 2009-250987 A | 10/2009 |
| JP | 2011-151652 A | 8/2011 |
| JP | 2012-199701 A | 10/2012 |
| JP | 2012-253447 A | 12/2012 |
| JP | 2013-055694 A | 3/2013 |
| JP | 2014-045474 A | 3/2014 |
| WO | 2012/073336 A1 | 6/2012 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/047136 filed on Dec. 17, 2020, which claims priority benefit of Japanese Patent Application No. JP 2019-238899 filed in the Japan Patent Office on Dec. 27, 2019. Each of the above-referenced applications is hereby incorporated herein by reference in its entirety.

FIELD

The present invention relates to an information processing apparatus, an information processing method, and an information processing program.

BACKGROUND

There have been various known proposed techniques of displaying a stereoscopic image on a display. These proposed techniques include a technique regarding autostereoscopic display that does not use a tool such as glasses. Examples of the display related to autostereoscopic display include a Light Field display represented by a lenticular method. In a case where a stereoscopic image is displayed on the Light Field display, user's left and right viewpoint positions are detected, and optimal light beams are collected at the viewpoint positions so as to generate a right eye image and a left eye image.

For example, Patent Literature 1 discloses a technique of calculating which viewpoint light beam is visible when the user views each pixel of the display that displays the stereoscopic image with the left and right eyes, based on the position information regarding the user. In addition, the proposed technique includes a technique of inverting pixel display in a case where reverse vision occurs when viewed from the user, and stopping stereoscopic image display and switching to planar image display in a case where crosstalk occurs when viewed from the user.

CITATION LIST

Patent Literature

Patent Literature 1: JP 2014-45474 A

SUMMARY

Technical Problem

However, with the above-described known technique, it is not always possible to achieve appropriate display of the stereoscopic image. For example, the above-described known technique only presents the technique of inverted display of the pixel when the reverse vision occurs when viewed from the user and the technique of stopping the stereoscopic image display (switching the image to planar image display) when the crosstalk occurs when viewed from the user, and thus, is not always possible to appropriately display the stereoscopic image.

In view of this, the present disclosure proposes an information processing apparatus, an information processing method, and an information processing program capable of appropriately displaying a stereoscopic image.

Solution to Problem

To solve the above problem, an information processing apparatus includes: a calculation unit that calculates an index value related to display of stereoscopic image content including a stereoscopic image based on a relative position of a viewer with respect to a position of a display unit that displays the stereoscopic image; and a display control unit that controls display processing performed by the display unit based on the index value calculated by the calculation unit.

DESCRIPTION OF EMBODIMENTS

Embodiments of the present disclosure will be described below in detail with reference to the drawings. Note that, in each of the following embodiments, the same parts are denoted by the same reference symbols, and a repetitive description thereof will be omitted.

The present disclosure will be described in the following order.

1. Embodiments
1-1. Overview
1-2. Configuration
1-3. Information processing procedure
2. Effects according to present disclosure
3. Hardware configuration

1. Embodiments

[1-1. Overview]

In recent years, there has been a known system that tracks a viewpoint position of a user on a display unit that displays content including a stereoscopic image (hereinafter, also referred to as stereoscopic image content) and displays the stereoscopic image content to a user wearing no special glasses. In such a system, when the viewpoint position of the user deviates from a displayable range determined by hardware devices (for example, a tracking device, a display, or the like), there is a problem that the user cannot comfortably view the stereoscopic image content because of the reason that the image is seen double for the user, for example.

Furthermore, depending on the viewpoint position of the user, there is a possibility that the user happens to be able to view a prohibited region, which is a region prohibited to be viewed by the viewer (for example, the region of the content that the creator of the content has designated as a region hidden from the user). In this manner, there have been cases where a stereoscopic image cannot be appropriately displayed with known techniques.

To handle this issue, an information processing apparatus 100 according to an embodiment of the present disclosure presets a viewpoint position at which the user cannot comfortably view the stereoscopic image content and a viewpoint position at which the prohibited region is visible to the user. When the user is located near the viewpoint position where the stereoscopic image content cannot be comfortably viewed, the information processing apparatus 100 performs display of guiding the user to move to the viewpoint position where the stereoscopic image content can be comfortably viewed (hereinafter, also referred to as viewing position guidance display). This makes it possible for the information processing apparatus 100 to directly guide the user to move to the viewing position where the stereoscopic image content can be comfortably viewed. This enables the information processing apparatus 100 to appropriately display the stereoscopic image.

Furthermore, in a case where the user has reached the viewpoint position at which the stereoscopic image content cannot be comfortably viewed or the viewpoint position at which the prohibited region is visible, the information processing apparatus 100 switches the display to a display that allows the user to understand that the stereoscopic image content cannot be comfortably viewed (hereinafter, also referred to as fallback display). This makes it possible for the information processing apparatus 100 to indirectly guide the user to move to the viewing position where the stereoscopic image content can be comfortably viewed. This enables the information processing apparatus 100 to appropriately display the stereoscopic image.

Figure 1:
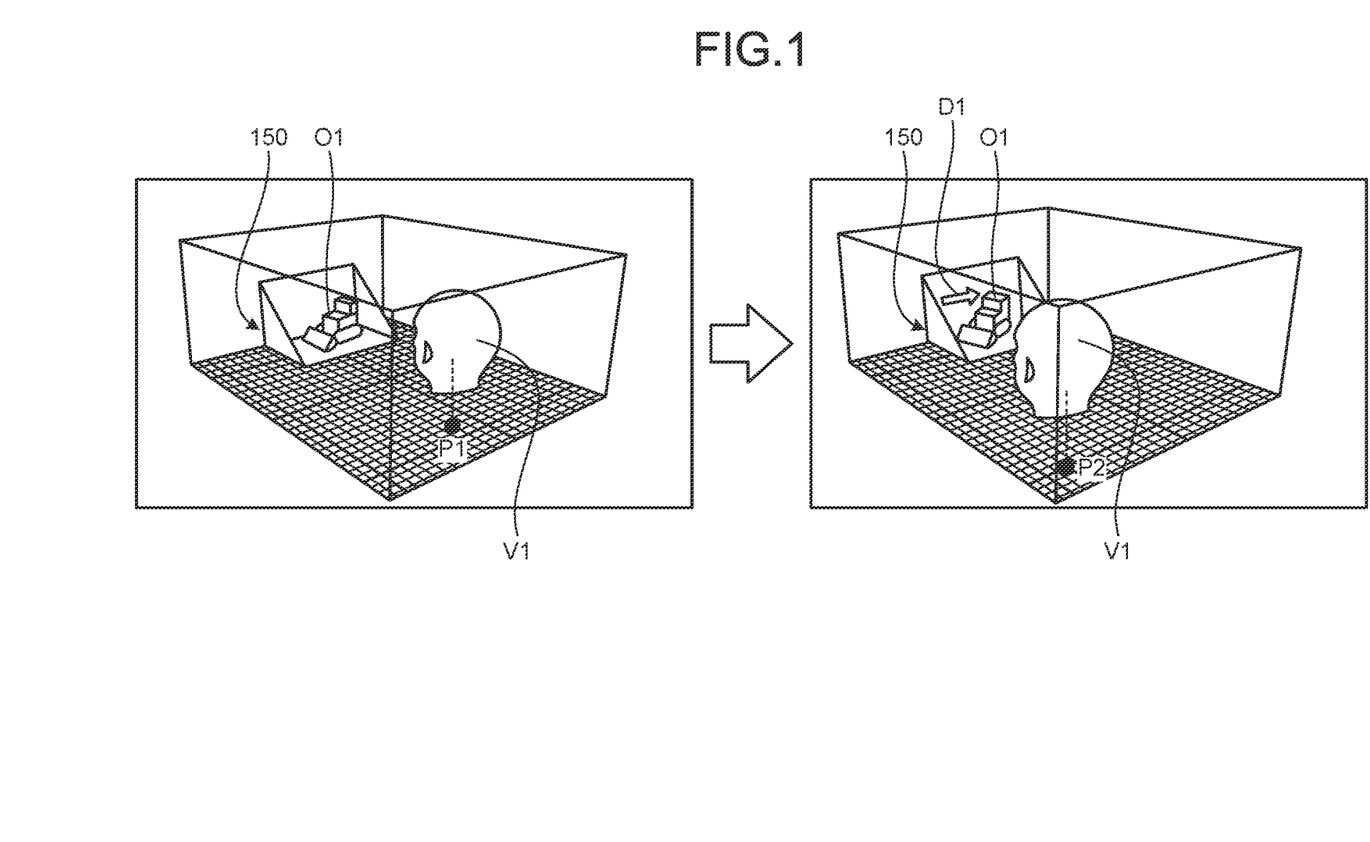
FIG. 1 is a diagram illustrating an outline of an embodiment of the present disclosure.

An outline of the embodiment of the present disclosure will be described below with reference to FIGS. 1 and 2. First, viewing position guidance display processing according to the embodiment of the present disclosure will be described with reference to FIG. 1. FIG. 1 is a diagram illustrating an outline of the embodiment of the present disclosure. On the left side of FIG. 1, the information processing apparatus 100 acquires a relative position P1 of a viewer V1 with respect to the position of a display unit 150 that displays a stereoscopic image. Subsequently, the information processing apparatus 100 calculates an index value R1 related to display of the stereoscopic image content at the relative position P1 of the viewer V1. The information processing apparatus 100 then determines whether the calculated index value R1 exceeds a first threshold. Having determined that the index value R1 exceeds the first threshold, the information processing apparatus 100 displays stereoscopic image content in which an object O1 is displayed as a stereoscopic image on the display unit 150 as normal.

On the other hand, on the right side of FIG. 1, the information processing apparatus 100 acquires a relative position P2 of the viewer V1 with respect to the position of the display unit 150 that displays the stereoscopic image. Subsequently, the information processing apparatus 100 calculates an index value R2 related to display of the stereoscopic image content at the relative position P2 of the viewer V1. The information processing apparatus 100 then determines whether the calculated index value R2 exceeds the first threshold. Having determined that the index value R2 is the first threshold or less, the information processing apparatus 100 determines whether the index value R2 exceeds a second threshold. Having determined that the index value R2 exceeds the second threshold, the information processing apparatus 100 displays, on the display unit 150, an arrow D1 instructing the viewer V1 to move in a direction of increasing the index value.

Next, fallback display processing according to the embodiment of the present disclosure will be described with reference to FIG. 2. FIG. 2 is a diagram illustrating an overview of the embodiment of the present disclosure. On the left side of FIG. 2, similarly to the left side of FIG. 1, the information processing apparatus 100 displays stereoscopic image content in which the object O1 is displayed as a stereoscopic image on the display unit 150 as normal.

Figure 2:
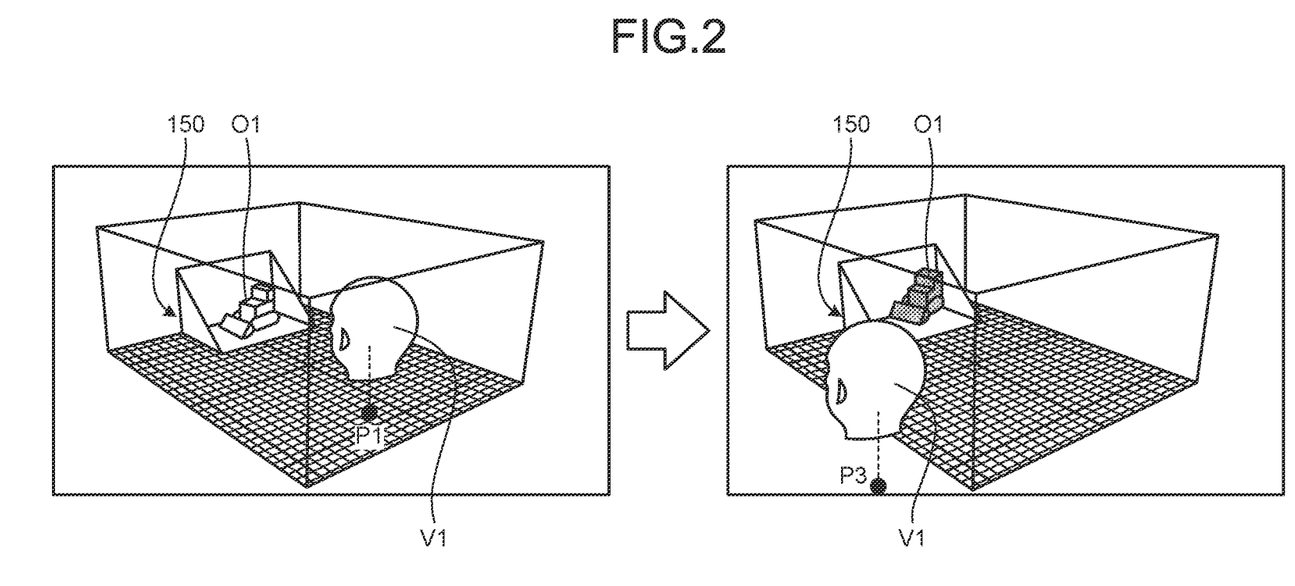
FIG. 2 is a diagram illustrating an outline of the embodiment of the present disclosure.

On the other hand, on the right side of FIG. 2, the information processing apparatus 100 acquires a relative position P3 of the viewer V1 with respect to the position of the display unit 150 that displays the stereoscopic image. Subsequently, the information processing apparatus 100 calculates an index value R3 related to display of the stereoscopic image content at the relative position P3 of the viewer V1. The information processing apparatus 100 then determines whether the calculated index value R3 exceeds the first threshold. Having determined that the index value R3 is the first threshold or less, the information processing apparatus 100 determines whether the index value R3 exceeds the second threshold. Having determined that the index value R3 is the second threshold or less, the information processing apparatus 100 adjusts saturation of the display unit 150 such that the saturation becomes proportional to the index value R3. For example, the information processing apparatus 100 switches display such that the stereoscopic image content displayed in color is to be displayed in monochrome.

As described above, the information processing apparatus 100 calculates the index value related to display of the stereoscopic image content including the stereoscopic image based on the relative position of the viewer with respect to the position of the display unit that displays the stereoscopic image. The information processing apparatus 100 controls display processing performed by the display unit based on the calculated index value. This makes it possible for the information processing apparatus 100 to directly or indirectly guide the user to move to the viewing position where the stereoscopic image content can be comfortably viewed. This enables the information processing apparatus 100 to appropriately display the stereoscopic image.

[1-2. Configuration]

Figure 3:
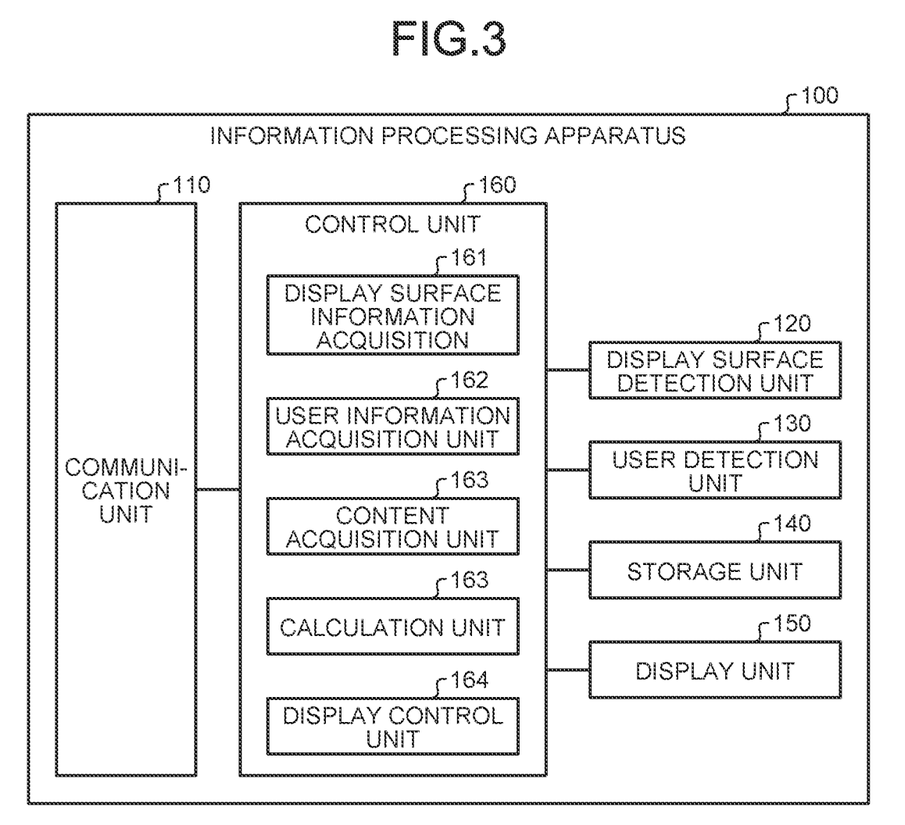
FIG. 3 is a block diagram illustrating a configuration example of an information processing apparatus according to the embodiment.

Next, a configuration of the information processing apparatus 100 according to the embodiment of the present disclosure will be described with reference to FIG. 3. FIG. 3 is a block diagram illustrating a configuration example of the information processing apparatus 100 according to the embodiment. As illustrated in FIG. 3, the information processing apparatus 100 includes a communication unit 110, a display surface detection unit 120, a user detection unit 130, a storage unit 140, the display unit 150, and a control unit 160. Note that the information processing apparatus 100 may include an input unit (for example, a keyboard, a mouse, or the like) that receives various operations from an administrator of the information processing apparatus 100, or the like. Furthermore, the information processing apparatus 100 may acquire information related to the user from a tracking device 10 illustrated in FIG. 4 instead of the user detection unit 130.

(Communication Unit 110)

The communication unit 110 is actualized by a network interface card (NIC), for example. The communication unit 110 is connected to a network with a wired or wireless channel, and exchanges information with the tracking device 10 (refer to FIG. 4).

(Display Surface Detection Unit 120)

The display surface detection unit 120 detects the posture of a display surface 50 (not illustrated) of the display unit 150. Specifically, the display surface detection unit 20 detects an angle formed between a floor surface (horizontal plane) and the display surface 50 in the real space as the posture of the display surface 50. For example, the display surface detection unit 20 detects an angle larger than 0 degrees and 90 degrees or less as an angle formed by the floor surface and the display surface 50 in the real space. In addition, after having detected the posture of the display surface 50, the display surface detection unit 120 provides information regarding the detected posture of the display surface 50 to the control unit 160.

The display surface detection unit 120 is actualized by, for example, any one of an acceleration sensor, a gyro sensor, and a magnetic sensor, having a predetermined relationship with the display surface 50, or a combination of the above.

(User Detection Unit 130)

The user detection unit 130 detects information related to the user observing the stereoscopic image. Specifically, the user detection unit 130 detects the position and posture of the user. For example, the user detection unit 130 detects the relative position and posture of the user with respect to the display surface 50. For example, the user detection unit 130 detects the position of the user's eyes as the position of the user. For example, the user detection unit 130 detects the position of the left eye of the user and the position of the right eye of the user as the position of the user. Furthermore, for example, the user detection unit 130 detects the orientation of the face of the user as the posture of the user. Furthermore, the user detection unit 130 detects the line-of-sight directions of the left eye and the right eye of the user as the posture of the user.

The user detection unit 130 is actualized by, for example, any one of a camera, a depth camera, and a human sensor, or a combination of the above.

(Storage Unit 140)

The storage unit 140 is implemented by semiconductor memory elements such as random access memory (RAM) and flash memory, or other storage devices such as a hard disk or an optical disc.

(Display Unit 150)

The display unit 150 is a display that displays a stereoscopic image under the control of the control unit 160 described below. Specifically, the display unit 150 is an autostereoscopic display (autostereoscopic image display device). In the display unit 150, a surface that displays a stereoscopic image is the display surface 50.

As illustrated in FIG. 1, the display unit 150 can be installed such that the display surface 50 is inclined (non-perpendicular) with respect to a floor surface (horizontal plane) in the real space. That is, the display unit 150 is set such that the floor surface of the real space and the display surface 50 form an angle larger than 0 degrees and 90 degrees or less. Note that, as illustrated in FIG. 1, the display unit 150 may have a mechanism (housing) that supports the display surface 50.

(Control Unit 160)

The control unit 160 is a controller and is actualized by execution of various programs (corresponding to an example of an information processing program) stored in a storage device inside the information processing apparatus 100 by a central processing unit (CPU), a micro processing unit (MPU), using the RAM as a work area, for example. In addition, the control unit 160 is a controller and is implemented by an integrated circuit such as an application specific integrated circuit (ASIC) or a field programmable gate array (FPGA), for example.

As illustrated in FIG. 3, the control unit 160 includes a display surface information acquisition unit 161, a user information acquisition unit 162, a content acquisition unit 163, a calculation unit 164, and a display control unit 165, and implements or executes operations of information processing described below. The internal configuration of the control unit 160 is not limited to the configuration illustrated in FIG. 3, and may be any other configuration as long as it is a configuration that performs information processing described below.

(Display Surface Information Acquisition Unit 161)

The display surface information acquisition unit 161 acquires display surface information related to the display surface 50. Specifically, the display surface information acquisition unit 161 acquires, from the display surface detection unit 120, information regarding the angle (the posture of the display surface 50) formed by the floor surface and the display surface 50 in the real space, as the display surface information. In addition, the display surface information acquisition unit 161 acquires information regarding the distance from the lower end to the upper end of the display surface 50 from the storage unit 140 as the display surface information. In addition, the display surface information acquisition unit 161 provides the acquired display surface information to the display control unit 165.

(User Information Acquisition Unit 162)

The user information acquisition unit 162 acquires user information which is information related to the user. Specifically, the user information acquisition unit 162 acquires, as the user information, information regarding the position (position of left eye of user and position of right eye of user) and the posture of the user from the user detection unit 130.

Note that the user information acquisition unit 162 may directly or indirectly acquire the information regarding the position and posture of the user from the user detection unit 130. For example, in a case where the user detection unit 130 is a tracking device, the user information acquisition unit 162 may directly acquire the user information from the user detection unit 130. Furthermore, in a case where the user detection unit 130 is a camera oriented in an observation direction of the display surface 50, the user information acquisition unit 162 may specify and indirectly acquire the user information based on the image provided from the user detection unit 130. Furthermore, the user information acquisition unit 162 provides the acquired user information to the display control unit 165.

(Content Acquisition Unit 163)

The content acquisition unit 163 acquires content data related to display. For example, the content acquisition unit 163 reads and acquires content data stored in the storage unit 140. The content acquisition unit 163 provides the acquired content data to the display control unit 165.

(Calculation Unit 164)

The calculation unit 164 calculates an index value R (x, y, z) related to display of the stereoscopic image content including the stereoscopic image based on the relative position of the viewer with respect to the position of the display unit that displays the stereoscopic image. Here, (x, y, z) indicates the relative position of the viewer with respect to the position of the display unit that displays the stereoscopic image. In addition, R (x, y, z) is assumed to be normalized in a range of 0 to 1.

Specifically, the calculation unit 164 designates an index value related to display of the stereoscopic image content (hereinafter, also referred to as a content index value) in the coordinate system having the center of the stereoscopic image content as the origin. For example, the calculation unit 164 designates the content index value of each position designated by the distance from the center of the stereoscopic image content and the angle. Subsequently, the calculation unit 164 converts the content index value into a value in a relative coordinate system centered on the position of the display unit based on the display position of the stereoscopic image content with respect to the display unit. The calculation unit 164 calculates the content index value converted into the value of the relative coordinate system centered on the position of the display unit, as the index value related to display of the stereoscopic image content. In this manner, the calculation unit 164 calculates the index value R (x, y, z) related to display of the stereoscopic image content based on the display position of the stereoscopic image content with respect to the display unit.

Furthermore, the calculation unit 164 calculates an index value related to display of the stereoscopic image based on the display amount of the prohibited region in the stereoscopic image content, the prohibited region being a region prohibited to be viewed by the viewer. Specifically, the calculation unit 164 designates a prohibited region which is prohibited to be viewed by the viewer in the stereoscopic image content. Subsequently, at the time of rendering stereoscopic image content from each relative position of the viewer with respect to the position of the display unit, the calculation unit 164 calculates the number of pixels used for the rendering of the designated prohibited region (hereinafter, also referred to as the number of pixels of the prohibited region). The calculation unit 164 then calculates the number of pixels of the prohibited region with respect to all the number of pixels rendered from each relative position of the viewer with respect to the position of the display unit, as the index value related to display of the stereoscopic image content. For example, the calculation unit 164 calculates the index value R (x, y, z) related to the display of the stereoscopic image based on Formula (1).

$$R(x, y, z) = \frac{\text{Number of Pixels used for rendering prohibited region}}{\text{All number of Pixels}} \quad (1)$$

Figure 7:
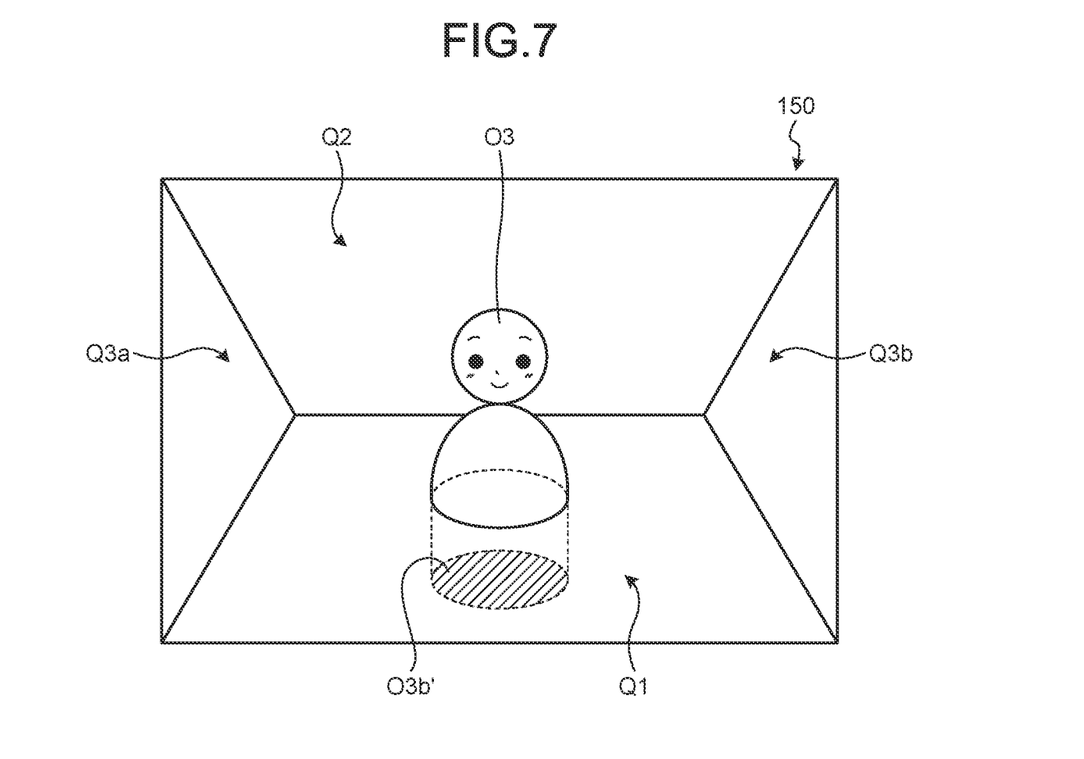
FIG. 7 is a diagram illustrating a modification according to the embodiment.

Furthermore, the calculation unit 164 calculates an index value related to display of the stereoscopic image content based on the number of reflections in the prohibited region which is prohibited to be viewed by the viewer. This point will be described with reference to FIG. 7. FIG. 7 is a diagram illustrating a modification according to the embodiment. In FIG. 7, the display unit 150 displays an object O3 being a biological model in a state of floating from a floor surface Q1. In addition, the calculation unit 164 designates a bottom surface of the object O3 in the stereoscopic image content displayed on the display unit 150, as a prohibited region. In FIG. 7, the floor surface Q1 is a mirror surface. As illustrated in FIG. 7, although a bottom surface O3 of the object O3, which is the prohibited region, is not visible when viewed from the front, a bottom surface O3b' of the object O3 is reflected on the floor surface Q1, which is the mirror surface.

Here, FIG. 7 illustrates execution of rendering using ray tracing. In rendering stereoscopic image content by ray tracing from each relative position of the viewer with respect to the position of the display unit, the calculation unit 164 calculates the number of pixels of a prohibited region with rays based on whether the ray emitted from each pixel has arrived, including reflection, at the prohibited region. In FIG. 7, the number of pixels of the bottom surface O3b' being the prohibited region reflected on the floor surface Q1 that is the mirror surface is calculated. Subsequently, the calculation unit 164 calculates the number of pixels of the prohibited region with rays including the reflection relative to all the number of pixels rendered from each relative position of the viewer with respect to the position of the display unit, as the index value related to display of the stereoscopic image content. For example, the calculation unit 164 calculates the index value R (x, y, z) related to the display of the stereoscopic image based on Formula (2).

$$R(x, y, z) = \frac{\text{Number of Pixels of prohibited region with rays}}{\text{All number of Pixels}} \quad (2)$$

Furthermore, the calculation unit 164 may weight the number of reflections according to the number of reflections in the prohibited region prohibited to be viewed by the viewer to calculate the index value related to display of the stereoscopic image content. For example, the calculation unit 164 calculates a score related to the weight of the number of reflections in the prohibited region based on Formula (3).

[Mathematical Expression 3]

$$\text{score} = \frac{1}{\text{Number of reflections}} \quad (3)$$

Subsequently, the calculation unit 164 calculates a sum of scores related to the weight of the number of reflections in the prohibited region. Subsequently, the calculation unit 164 calculates a score related to the weight of the number of reflections of the prohibited region relative to all the number of pixels rendered from each relative position of the viewer with respect to the position of the display unit, as the index value related to display of the stereoscopic image content. For example, the calculation unit 164 calculates the index value R (x, y, z) related to the display of the stereoscopic image based on Formula (4).

$$R(x, y, z) = \frac{\sum \text{score}}{\text{All number of Pixels}} \quad (4)$$

Furthermore, the calculation unit 164 calculates an index value related to display of stereoscopic image content based on a limit related to hardware devices such as a tracking device and a display. For example, when separate video images are presented to the left eye and the right eye using a display unit that displays a stereoscopic image, the video image directed to one eye happens to be visible to the other eye, known as a phenomenon referred to as crosstalk. In addition, a crosstalk occurrence rate C (0 to 100%) when the stereoscopic image display is viewed from each relative position of the viewer with respect to the position of the stereoscopic image display can be calculated from the optical characteristics of the stereoscopic image display. Accordingly, the calculation unit 164 calculates the index value related to display of the stereoscopic image content based on the crosstalk occurrence rate at each viewing position. Specifically, the calculation unit 164 calculates the index value related to display of the stereoscopic image content such that the index value becomes 0 in a case where the crosstalk occurrence rate C exceeds a threshold (Threshould). For example, the calculation unit 164 calculates the index value R (x, y, z) related to the display of the stereoscopic image based on Formula (5).

$$R(x, y, z) = \begin{cases} \frac{\text{Threshold} - C}{\text{Threshold}}(\text{Threshold} - C \geq 0) \\ 0(\text{Threshold} - C < 0) \end{cases} \quad (5)$$

In addition, the calculation unit 164 calculates a gradient vector Rg (x, y, z) of the index value R (x, y, z) related to the display of the stereoscopic image based on Formula (6).

$$R_g(x,y,z) = \nabla R \quad (6)$$

In addition, the calculation unit 164 calculates a reliability P (x, y, z) of the detection result of the user position using a known technique. Here, (x, y, z) indicates the relative position of the viewer with respect to the position of the display unit that displays the stereoscopic image. In addition, P (x, y, z) is assumed to be normalized in a range of 0 to 1.

(Display Control Unit 165)

The display control unit 165 controls display performed by the display unit 150 based on the display surface information provided from the display surface information acquisition unit 161, the user information provided from the user information acquisition unit 162, and the content data provided from the content acquisition unit 163.

Specifically, the display control unit 165 acquires, from the storage unit 140, a left-eye display image R1L and a right-eye display image R1R to be displayed on the display unit 150 being an autostereoscopic display. The display control unit 165 then controls the display surface 50 to perform display such that a combination of the left-eye display image and the right-eye display image is perceived by the user as a stereoscopic image.

Furthermore, the display control unit 165 may control to display the stereoscopic image on the display surface 50 of the display unit 150 so as to allow observation of a stereoscopic object arranged on the floor surface.

The content to be displayed under the control of the display control unit 165 is not limited to the above example. For example, the display control unit 165 may control to display the stereoscopic image on the display surface 50 of the display unit 150 so as to allow observation of a side wall surface (third plane) that is in contact with a left end or a right end of the display surface 50 and is perpendicular to the floor surface (that is, perpendicular to the floor surface).

In addition, the display control unit 165 controls the display processing of the display unit based on the index value R (x, y, z) related to display of the stereoscopic image content calculated by the calculation unit 164. Specifically, the display control unit 165 controls the display processing of the display unit such that, when the index value calculated by the calculation unit 164 is a first threshold or less, the viewing position of the viewer will be guided to a viewing range of the stereoscopic image content. More specifically, the display control unit 165 displays, on the display unit, guidance information guiding the viewing position of the viewer to the viewing range of the stereoscopic image content. For example, the display control unit 165 displays guidance information on the display unit, the guidance information being an arrow instructing the viewer to move in a direction of increasing the index value. For example, in the example illustrated on the right side of FIG. 1, when the index value R (x, y, z) is the first threshold or less, the display control unit 165 displays an arrow instructing to be directed in the direction of the gradient vector Rg (x, y, z).

Furthermore, the display control unit 165 controls the display mode of the stereoscopic image content so as to guide the viewing position of the viewer to the viewing range of the stereoscopic image content. For example, the display control unit 165 controls display processing of the display unit so as to move the stereoscopic image content in a direction of increasing the index value. For example, when the index value R (x, y, z) is the first threshold or less, the display control unit 165 translates the display of the entire stereoscopic image content in the direction of the gradient vector Rg (x, y, z).

In addition, the display control unit 165 displays the biological model on the display unit while operating the biological model to direct a line of sight of the biological model displayed as a stereoscopic image in a direction of increasing the index value. For example, in a case where a stereoscopic image of a human is displayed on the display unit, and when the index value R (x, y, z) is the first threshold or less, the display control unit 165 causes the model of the human to perform an operation of directing a line of sight toward a point to which the model of the human moves in the direction of the gradient vector Rg (x, y, z).

In addition, the display control unit 165 controls the display processing of the display unit such that, when the index value R (x, y, z) calculated by the calculation unit 164 is the second threshold or less, the visibility of the display of the display unit will be lowered. In addition, the display control unit 165 controls the display processing of the display unit such that, when the reliability P (x, y, z) calculated by the calculation unit 164 is a third threshold or less, the visibility of the display of the display unit will be lowered.

More specifically, the display control unit 165 adjusts the saturation of the display unit such that, when the index value R (x, y, z) is the second threshold or less, the saturation becomes proportional to the index value. For example, in the example illustrated on the right side of FIG. 2, the display control unit 165 controls to set the image to be completely monochrome when the index value is 0. For example, the display control unit 165 adjusts the saturation of the stereoscopic image content based on Formula (7).

$$S = S^*(R(x,y,z)/\text{threshold}) \quad (7)$$

Furthermore, in a case where the reliability P (x, y, z) is the third threshold or less, the display control unit 165 adjusts the saturation of the display unit such that the saturation becomes proportional to the index value. For example, the display control unit 165 controls to set the image to be completely monochrome when the reliability is 0. For example, the display control unit 165 adjusts the saturation of the stereoscopic image content based on Formula (8).

$$S = S^*P/\text{threshold} \quad (8)$$

In addition, in a case where the index value R (x, y, z) is the second threshold or less, or the reliability P (x, y, z) is the third threshold or less, the display control unit 165 applies Gaussian blur to the stereoscopic image content. For example, when the index value R (x, y, z) is the second threshold or less, the display control unit 165 applies Gaussian blur such that the standard deviation of the Gaussian blur applied to the stereoscopic image content is proportional to the index value.

In a case where the index value R (x, y, z) is the second threshold or less, or the reliability P (x, y, z) is the third threshold or less, the display control unit 165 adjusts luminance of the stereoscopic image content according to the value of R or P. For example, when the index value R (x, y, z) is the second threshold or less, the display control unit 165 adjusts the luminance of the display unit such that the luminance becomes proportional to the index value. For example, the display control unit 165 controls such that the screen becomes completely dark when the index value is 0. For example, the display control unit 165 adjusts the luminance of the stereoscopic image content based on Formula (9).

$$V=V*R(x,y,z)/\text{threshold} \qquad (9)$$

Figure 6:
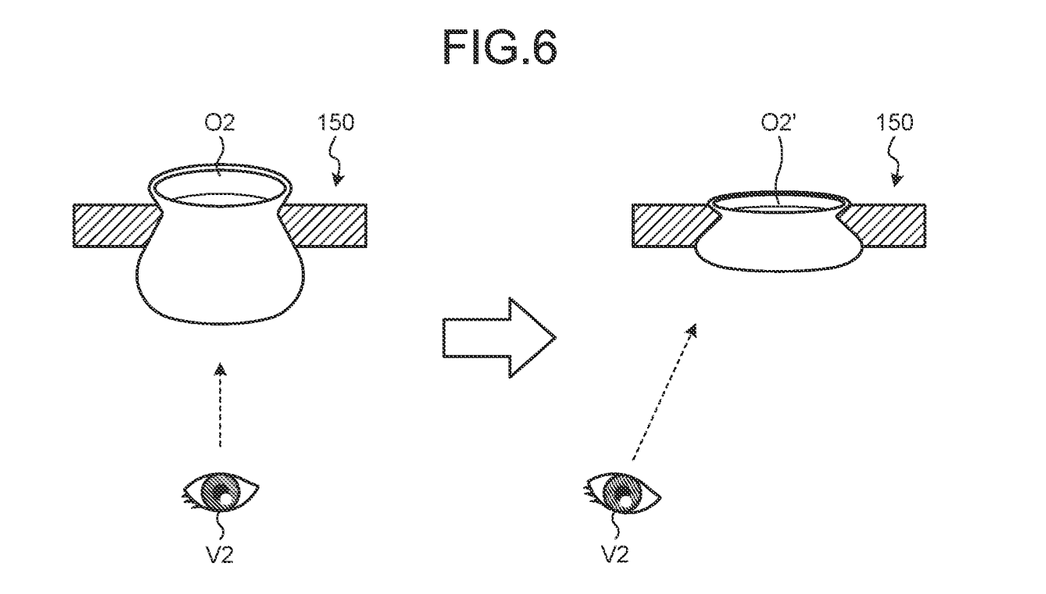
FIG. 6 is a diagram illustrating a modification according to the embodiment.

Furthermore, in a case where the index value R (x, y, z) is the second threshold or less, or the reliability P (x, y, z) is the third threshold or less, the display control unit 165 compresses the depth of the display content according to the value of R or P. For example, in a case where the index value R (x, y, z) is the second threshold or less, the display control unit 165 performs depth adjustment such that the depth of the stereoscopic image content becomes proportional to the index value. For example, when the index value is 0, the display control unit 165 makes completely planar display. This point will be described with reference to FIG. 6. FIG. 6 is a diagram illustrating a modification according to the embodiment. On the left side of FIG. 6, the index value R (x, y, z) exceeds the second threshold, and thus, the display control unit 165 displays an object O2 being the stereoscopic image content as normal. In contrast, on the right side of FIG. 6, the index value R (x, y, z) is the second threshold or less, and thus, the display control unit 165 compresses the depth of the object O2 so that the depth of the stereoscopic image content is proportional to the index value. For example, the display control unit 165 adjusts the depth of the stereoscopic image content based on Formula (10).

$$Z=Z*R(x,y,z)/\text{threshold} \qquad (10)$$

Furthermore, the display control unit 165 compresses the depth of the stereoscopic image content according to the rotation angle of the viewer's face when the direction from the position of the display unit toward the position of the viewer is set as a rotation axis. For example, the display control unit 165 compresses the depth of the stereoscopic image content so as to be proportional to the cosine function of the rotation angle of the viewer's face when the direction from the position of the display unit toward the position of the viewer is set as the rotation axis. For example, the display control unit 165 adjusts the depth of the stereoscopic image content based on Formula (11).

$$Z=Z*\cos 0 \qquad (10)$$

Furthermore, in a case where the index value R (x, y, z) is the second threshold, or the reliability P (x, y, z) is the third threshold or less, the display control unit 165 stops the moving image being the stereoscopic image content. However, this is performed without stopping the tracking, and operations such as the rendering position change on the stopped animation are performed as normal. After stopping the moving image, when the index value R (x, y, z) exceeds the second threshold or when the reliability P (x, y, z) exceeds the third threshold, the display control unit 165 resumes the animation of the display content from the portion several seconds before the stop.

Figure 4:
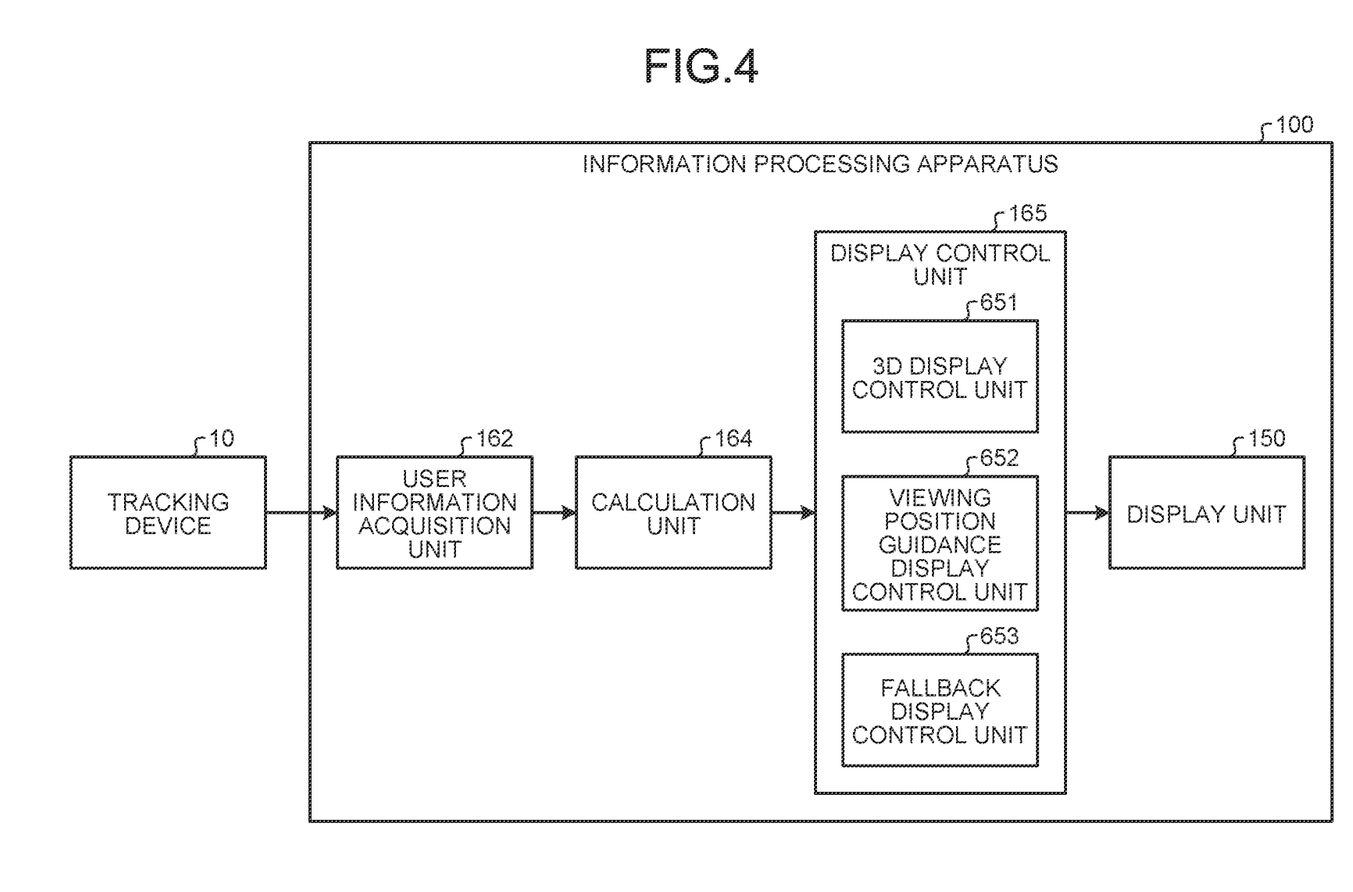
FIG. 4 is a block diagram illustrating functions of the information processing apparatus according to the embodiment.

Next, functions of the information processing apparatus according to the embodiment will be described with reference to FIG. 4. FIG. 4 is a block diagram illustrating functions of the information processing apparatus according to the embodiment. In the example illustrated in FIG. 4, the user information acquisition unit 162 acquires user viewing position information from the tracking device 10. Subsequently, after acquiring the viewing position information of the user from the user information acquisition unit 162, the calculation unit 164 calculates the index value R (x, y, z) related to display of the stereoscopic image content.

The display control unit 165 has functions of a 3D display control unit 651, a viewing position guidance display control unit 652, and a fallback display control unit 653. When the index value R (x, y, z) calculated by the calculation unit 164 exceeds the first threshold, the 3D display control unit 651 displays the stereoscopic image content on the display unit 150 as normal. When the index value R (x, y, z) calculated by the calculation unit 164 is the first threshold or less and exceeds the second threshold, the viewing position guidance display control unit 652 performs the viewing position guidance display on the display unit 150. When the index value R (x, y, z) calculated by the calculation unit 164 is the second threshold or less, the fallback display control unit 653 performs fallback display on the display unit 150.

[1-3. Information Processing Procedure]

Figure 5:
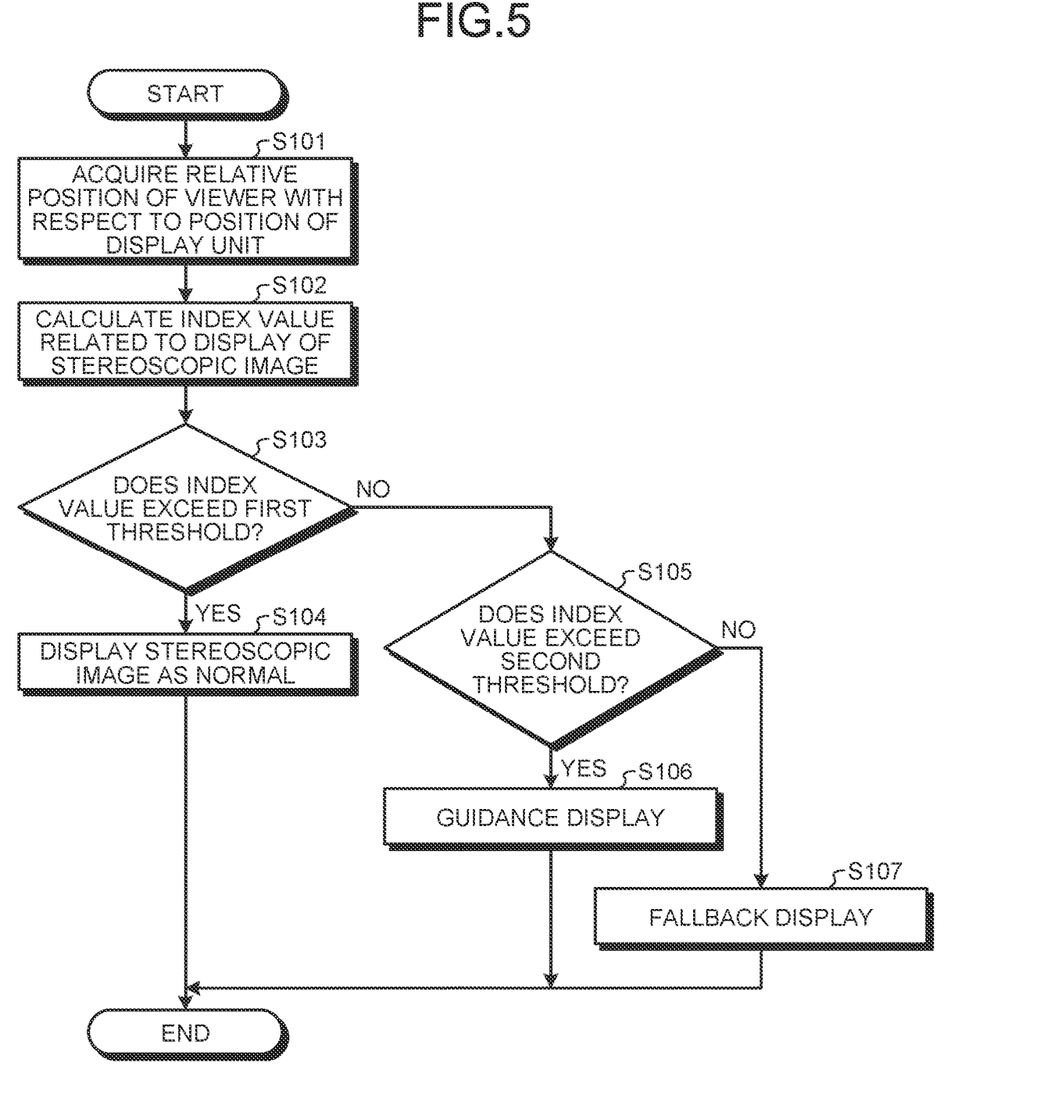
FIG. 5 is a flowchart illustrating a procedure of information processing according to the embodiment.

Next, an information processing procedure according to the embodiment will be described with reference to FIG. 5. FIG. 5 is a flowchart illustrating a procedure of information processing according to the embodiment. As illustrated in FIG. 5, the calculation unit 164 acquires a relative position of the viewer with respect to the position of the display unit that displays the stereoscopic image (step S101). Subsequently, the calculation unit 164 calculates an index value related to display of stereoscopic image content including a stereoscopic image (step S102).

Subsequently, the display control unit 165 determines whether the index value calculated by the calculation unit 164 exceeds the first threshold (step S103). When having determined that the index value exceeds the first threshold (step S103; Yes), the display control unit 165 displays the stereoscopic image content on the display unit as normal (step S104).

In contrast, when having determined that the index value is the first threshold or less (step S103; No), the display control unit 165 determines whether the index value exceeds the second threshold (step S105). When having determined that the index value exceeds the second threshold (step S105; Yes), the display control unit 165 controls the display processing performed by the display unit to guide the viewing position of the viewer to the viewing range of the stereoscopic image content (step S106).

In contrast, when having determined that the index value is the second threshold or less (step S105; No), the display control unit 165 controls the display processing performed by the display unit so as to reduce the visibility of the display made by the display unit (step S107).

2. Effects According to Present Disclosure

As described above, the information processing apparatus 100 according to the present disclosure includes the calculation unit 164 and the display control unit 165. The calculation unit 164 calculates the index value related to display of the stereoscopic image content including the stereoscopic image based on the relative position of the viewer with respect to the position of the display unit that displays the stereoscopic image. Based on the index value calculated by the calculation unit 164, the display control unit 165 controls display processing performed by the display unit.

This makes it possible for the information processing apparatus 100 to directly or indirectly guide the user to move to the viewing position where the stereoscopic image content can be comfortably viewed. This enables the information processing apparatus 100 to appropriately display the stereoscopic image.

Furthermore, the display control unit 165 controls the display processing performed by the display unit such that, when the index value calculated by the calculation unit 164 is the first threshold or less, the viewing position of the viewer will be guided to the viewing range of the stereoscopic image content. Moreover, the display control unit 165 displays, on the display unit, guidance information guiding the viewing position of the viewer to the viewing range of the stereoscopic image content. In addition, the display control unit 165 displays, on the display unit, guidance information being an arrow instructing the viewer to move in a direction of increasing the index value.

In this manner, when the user is located near the viewpoint position where the stereoscopic image content cannot be comfortably viewed, the information processing apparatus 100 performs display referred to as viewing position guidance display of guiding the user to move to the viewpoint position where the stereoscopic image content can be comfortably viewed. This makes it possible for the information processing apparatus 100 to directly guide the user to move to the viewing position where the stereoscopic image content can be comfortably viewed. This enables the information processing apparatus 100 to appropriately display the stereoscopic image.

Furthermore, the display control unit 165 controls the display mode of the stereoscopic image content so as to guide the viewing position of the viewer to the viewing range of the stereoscopic image content. In addition, the display control unit 165 controls the display processing of the display unit so as to move the stereoscopic image content in a direction of increasing the index value.

This makes it possible for the information processing apparatus 100 to urge the user to move in an identical direction by moving the entire gaze region of the user in a certain direction.

In addition, the display control unit 165 displays the biological model on the display unit while operating the biological model to direct a line of sight of the biological model displayed as a stereoscopic image in a direction of increasing the index value.

This makes it possible for the information processing apparatus 100 to urge the user to move to make eye contact with the human model, for example, and can urge the user to move in a direction of increasing the index value.

In addition, the display control unit 165 controls the display processing of the display unit such that, when the index value calculated by the calculation unit 164 is the second threshold or less, the visibility of the display of the display unit will be lowered.

In this manner, in a case where the user has reached the viewpoint position at which the stereoscopic image content cannot be comfortably viewed or the viewpoint position at which the prohibited region is visible, the information processing apparatus 100 switches the display to display referred to as fallback display that allows the user to understand that the stereoscopic image content cannot be comfortably viewed. This makes it possible for the information processing apparatus 100 to indirectly guide the user to move to the viewing position where the stereoscopic image content can be comfortably viewed. This enables the information processing apparatus 100 to appropriately display the stereoscopic image.

Furthermore, the display control unit 165 adjusts the saturation of the display unit such that the saturation becomes proportional to the index value.

This makes it possible for the information processing apparatus 100 to allow the user to visually easily recognize that the stereoscopic image content cannot be comfortably viewed.

In addition, the display control unit 165 applies Gaussian blur such that the standard deviation of the Gaussian blur applied to the stereoscopic image content is proportional to the index value.

This makes it possible for the information processing apparatus 100 to allow the user to visually easily recognize that the stereoscopic image content cannot be comfortably viewed.

Furthermore, the display control unit 165 adjusts the luminance of the display unit such that the luminance becomes proportional to the index value.

This makes it possible for the information processing apparatus 100 to allow the user to visually easily recognize that the stereoscopic image content cannot be comfortably viewed.

Furthermore, the display control unit 165 adjusts a depth of the stereoscopic image content such that the depth becomes proportional to the index value.

This makes it possible for the information processing apparatus 100 to allow the user to visually easily recognize that the stereoscopic image content cannot be comfortably viewed.

Furthermore, the display control unit 165 stops the moving image being stereoscopic image content.

This makes it possible for the information processing apparatus 100 to prevent quality degradation of user's experience due to the disturbance of the video image when the user enters the region at which comfortable viewing cannot be experienced.

Furthermore, the display control unit 165 compresses the depth of the stereoscopic image content so as to be proportional to the cosine function of the rotation angle of the viewer's face when the direction from the position of the display unit toward the position of the viewer is set as the rotation axis.

This makes it possible for the information processing apparatus 100 to prevent the viewer's face from rotating in the Z-axis direction. Incidentally, since the assumed stereoscopic image display has only binocular parallax in the horizontal direction, the more the viewer's face rotates in the Z-axis direction, the less the difference between the horizontal positions of both eyes.

Moreover, the calculation unit 164 calculates the index value related to display of the stereoscopic image content based on the display position of the stereoscopic image content with respect to the display unit.

This makes it possible for the information processing apparatus 100 to objectively grasp, by the index value, the viewing position at which the stereoscopic image content can be comfortably viewed.

Furthermore, the calculation unit 164 calculates an index value related to display of the stereoscopic image based on the display amount of the prohibited region in the stereoscopic image content, the prohibited region being a region prohibited to be viewed by the viewer.

This makes it possible for the information processing apparatus 100 to objectively grasp, by the index value, the viewing position at which the prohibited region being the region prohibited to be viewed by the viewer is visible.

Furthermore, the calculation unit 164 calculates an index value related to display of the stereoscopic image content based on the number of reflections in the prohibited region which is prohibited to be viewed by the viewer.

This makes it possible for the information processing apparatus 100 to prevent a phenomenon in which a surface of content that should not be seen is visible due to reflection on a mirror-like model.

Moreover, the calculation unit 164 calculates the index value related to display of the stereoscopic image content based on the crosstalk occurrence rate at each viewing position.

This makes it possible for the information processing apparatus 100 to objectively grasp, by the index value, the viewing position at which the stereoscopic image content can be comfortably viewed.

3. Hardware Configuration

Figure 8:
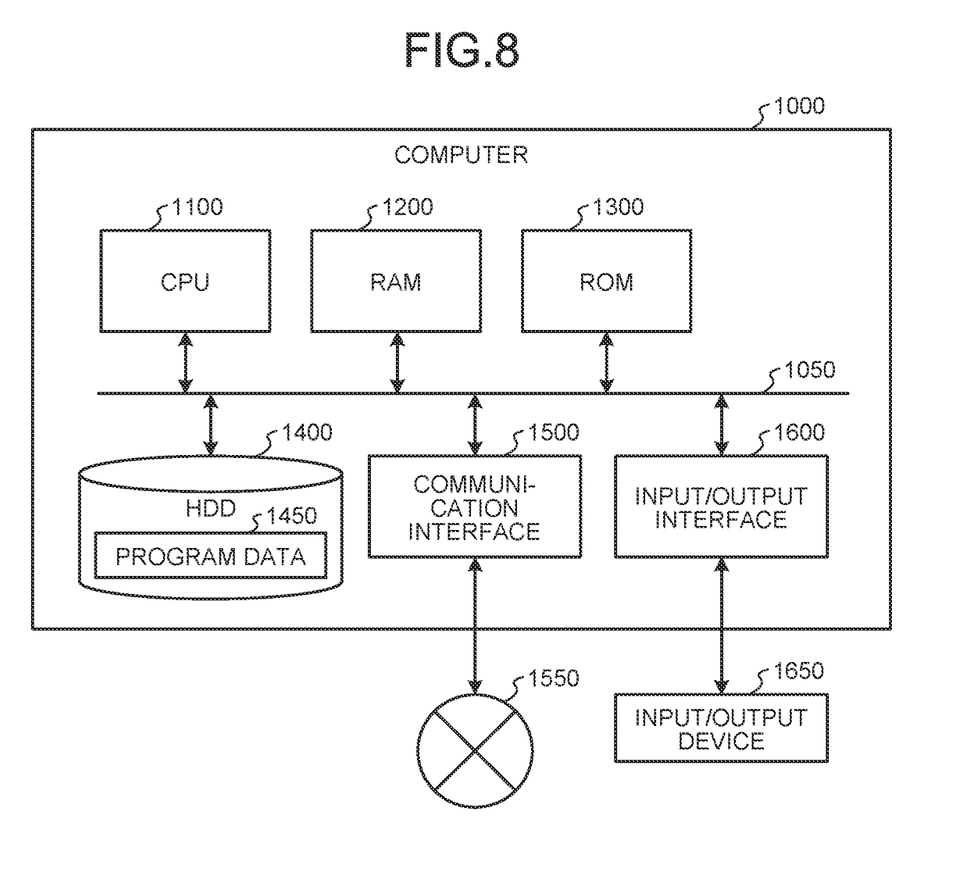
FIG. 8 is a hardware configuration diagram illustrating an example of a computer that actualizes functions of an information processing apparatus.

The information apparatus such as the information processing apparatus 100 according to the above-described embodiments and modifications are implemented by a computer 1000 having a configuration as illustrated in FIG. 8, for example. FIG. 8 is a hardware configuration diagram illustrating an example of the computer 1000 that implements the functions of the information processing apparatus such as the information processing apparatus 100. Hereinafter, the information processing apparatus 100 according to the embodiment will be described as an example. The computer 1000 includes a CPU 1100, RAM 1200, read only memory (ROM) 1300, a hard disk drive (HDD) 1400, a communication interface 1500, and an input/output interface 1600. Individual components of the computer 1000 are interconnected by a bus 1050.

The CPU 1100 operates based on a program stored in the ROM 1300 or the HDD 1400 so as to control each of components. For example, the CPU 1100 develops the program stored in the ROM 1300 or the HDD 1400 into the RAM 1200 and executes processing corresponding to various programs.

The ROM 1300 stores a boot program such as a basic input output system (BIOS) executed by the CPU 1100 when the computer 1000 starts up, a program dependent on hardware of the computer 1000, or the like.

The HDD 1400 is a non-transitory computer-readable recording medium that records a program executed by the CPU 1100, data used by the program, or the like. Specifically, the HDD 1400 is a recording medium that records an information processing program according to the present disclosure, which is an example of program data 1450.

The communication interface 1500 is an interface for connecting the computer 1000 to an external network 1550 (for example, the Internet). For example, the CPU 1100 receives data from other devices or transmits data generated by the CPU 1100 to other devices via the communication interface 1500.

The input/output interface 1600 is an interface for connecting between an input/output device 1650 and the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface for reading a program or the like recorded on predetermined recording medium (or simply medium). Examples of the media include optical recording media such as a digital versatile disc (DVD) or a phase change rewritable disk (PD), a magneto-optical recording medium such as a magneto-optical disk (MO), a tape medium, a magnetic recording medium, and semiconductor memory.

For example, when the computer 1000 functions as the information processing apparatus 100 according to the embodiment, the CPU 1100 of the computer 1000 executes the information processing program loaded on the RAM 1200 so as to implement the functions of the control unit 160 and the like. Furthermore, the HDD 1400 stores the information processing program according to the present disclosure or data in the storage unit 140. While the CPU 1100 executes the program data 1450 read from the HDD 1400, the CPU 1100 may acquire these programs from another device via the external network 1550, as another example.

Note that the present technology can also have the following configurations.

(1)

An information processing apparatus comprising:

a calculation unit that calculates an index value related to display of stereoscopic image content including a stereoscopic image based on a relative position of a viewer with respect to a position of a display unit that displays the stereoscopic image; and a display control unit that controls display processing performed by the display unit based on the index value calculated by the calculation unit.

(2)

The information processing apparatus according to (1), wherein the display control unit controls the display processing performed by the display unit such that, when the index value calculated by the calculation unit is a first threshold or less, a viewing position of the viewer will be guided to a viewing range of the stereoscopic image content.

(3)

The information processing apparatus according to (2), wherein the display control unit displays, on the display unit, guidance information which is information of guiding the viewing position of the viewer to the viewing range of the stereoscopic image content.

(4)

The information processing apparatus according to (3), wherein the display control unit displays the guidance information on the display unit, the guidance information being an arrow instructing the viewer to move in a direction of increasing the index value.

(5)

The information processing apparatus according to (2), wherein the display control unit controls a display mode of the stereoscopic image content so as to guide the viewing position of the viewer to the viewing range of the stereoscopic image content.

(6)

The information processing apparatus according to (5), wherein the display control unit controls display processing performed by the display unit so as to move the stereoscopic image content in a direction of increasing the index value.

(7)

The information processing apparatus according to any one of (2) to (6), wherein the display control unit displays, on the display unit, a biological model to be displayed as the stereoscopic image, while operating the biological model to direct a line of sight of the biological model in a direction of increasing the index value.

(8)

The information processing apparatus according to any one of (1) to (7), wherein the display control unit controls display processing performed by the display unit such that, when the index value calculated by the calculation unit is a second threshold or less, visibility of the display performed by the display unit will be lowered.

(9)

The information processing apparatus according to (8), wherein the display control unit adjusts saturation of the display unit such that the saturation becomes proportional to the index value.

(10)

The information processing apparatus according to (8) or (9), wherein the display control unit applies Gaussian blur such that a standard deviation of the Gaussian blur applied to the stereoscopic image content is proportional to the index value.

(11)

The information processing apparatus according to any one of (8) to (10), wherein the display control unit adjusts luminance of the display unit such that the luminance becomes proportional to the index value.

(12)

The information processing apparatus according to any one of (8) to (11), wherein the display control unit adjusts a depth of the stereoscopic image content such that the depth becomes proportional to the index value.

(13)

The information processing apparatus according to any one of (8) to (12), wherein the display control unit stops a moving image, the moving image being the stereoscopic image content.

(14)

The information processing apparatus according to (13), in which, when the index value calculated by the calculation unit becomes the second threshold or less and thereafter the index value exceeds the second threshold, the display control unit replays the moving image from a point being a predetermined time before the moving image is stopped.

(15)

The information processing apparatus according to any one of (8) to (14), wherein the display control unit compresses a depth of the stereoscopic image content so as to be proportional to a cosine function of a rotation angle of a face of the viewer when a direction from the position of the display unit toward a position of the viewer is set as a rotation axis.

(16)

The information processing apparatus according to any one of (1) to (15), in which the calculation unit designates the index value related to display of the stereoscopic image content based on a position or an angle of the stereoscopic image content in a coordinate system.

(17)

The information processing apparatus according to (16), wherein the calculation unit calculates the index value related to display of the stereoscopic image content based on a display position of the stereoscopic image content with respect to the display unit.

(18)

The information processing apparatus according to any one of (1) to (17), wherein the calculation unit calculates the index value related to display of the stereoscopic image based on a display amount of a prohibited region in the stereoscopic image content, the prohibited region being a region prohibited to be viewed by the viewer.

(19)

The information processing apparatus according to any one of (1) to (18), wherein the calculation unit calculates the index value related to display of the stereoscopic image content based on number of reflections of a prohibited region, the prohibited region being a region prohibited to be viewed by the viewer.

(20)

The information processing apparatus according to any one of (1) to (19), wherein the calculation unit calculates the index value related to display of the stereoscopic image content based on a crosstalk occurrence rate at each viewing position.

(21)

An information processing method to be executed by a computer, the method comprising:

calculating an index value related to display of stereoscopic image content including a stereoscopic image based on a relative position of a viewer with respect to a position of a display unit that displays the stereoscopic image; and controlling display processing performed by the display unit based on the calculated index value.

(22)

An information processing program causing a computer to execute procedures, the procedures comprising:

a calculation procedure of calculating an index value related to display of stereoscopic image content including a stereoscopic image based on a relative position of a viewer with respect to a position regarding a display procedure of displaying the stereoscopic image; and a display control procedure of controlling display processing performed with the display procedure based on the index value calculated with the calculation procedure.

REFERENCE SIGNS LIST

10 Tracking Device
100 Information Processing Apparatus
110 Communication Unit
120 Display Surface Detection Unit
130 User Detection Unit
140 Storage Unit
150 Display Unit
160 Control Unit
161 Display Surface Information Acquisition Unit
162 User Information Acquisition Unit 163 Content Acquisition Unit
164 Calculation Unit
165 Display Control Unit

The invention claimed is:

1. An information processing apparatus, comprising:
an autostereoscopic display configured to display stereoscopic image content including a stereoscopic image;
a central processing unit (CPU) configured to:
calculate an index value related to the display of stereoscopic image content based on
a relative position of a viewer with respect to a position of the autostereoscopic display, and
a display position of the stereoscopic image content with respect to the autostereoscopic display; and
control display processing of the autostereoscopic display based on the calculated index value.

2. The information processing apparatus according to claim 1, wherein the CPU is further configured to control the display processing such that, when the calculated index value is equal to or less than a first threshold, a viewing position of the viewer is guided to a viewing range of the stereoscopic image content.

3. The information processing apparatus according to claim 2, wherein the CPU is further configured to control the display unit to display guidance information which is information to guide the viewing position of the viewer to the viewing range of the stereoscopic image content.

4. The information processing apparatus according to claim 3, wherein the guidance information is an arrow to instruct the viewer to move in a direction of increasing the index value.

5. The information processing apparatus according to claim 2, wherein the CPU is further configured to control a display mode of the stereoscopic image content so as to guide the viewing position of the viewer to the viewing range of the stereoscopic image content.

6. The information processing apparatus according to claim 5, wherein the CPU is further configured to control the display processing so as to move the stereoscopic image content in a direction of increasing the index value.

7. The information processing apparatus according to claim 2, wherein the CPU is further configured to control the autostereoscopic display to display, a biological model to be displayed as the stereoscopic image based on operation of the biological model to direct a line of sight of the biological model in a direction of increasing the index value.

8. The information processing apparatus according to claim 1, wherein the CPU is further configured to control the display processing such that visibility of the display is lowered based on the calculated index value is equal to or less than a second threshold value.

9. The information processing apparatus according to claim 8, wherein the CPU is further configured to adjust saturation of the autostereoscopic display such that the saturation becomes proportional to the index value.

10. The information processing apparatus according to claim 8, wherein the CPU is further configured to apply Gaussian blur such that a standard deviation of the Gaussian blur applied to the stereoscopic image content is proportional to the index value.

11. The information processing apparatus according to claim 8, wherein the CPU is further configured to adjust luminance of the autostereoscopic display such that the luminance becomes proportional to the index value.

12. The information processing apparatus according to claim 8, wherein the CPU is further configured to adjust a depth of the stereoscopic image content such that the depth becomes proportional to the index value.

13. The information processing apparatus according to claim 8, wherein
the CPU is further configured to stop a moving image,
the moving image is the stereoscopic image content.

14. The information processing apparatus according to claim 8, wherein the CPU is further configured to compress a depth of the stereoscopic image content so as to be proportional to a cosine function of a rotation angle of a face of the viewer when a direction from the position of the autostereoscopic display toward a position of the viewer is set as a rotation axis.

15. The information processing apparatus according to claim 1, wherein
the CPU is further configured to calculate the index value related to display of the stereoscopic image based on a display amount of a prohibited region in the stereoscopic image content, and
the prohibited region is a region prohibited to be viewable by the viewer.

16. The information processing apparatus according to claim 1, wherein
the CPU is further configured to calculate the index value related to display of the stereoscopic image content based on a number of reflections of a prohibited region, and
the prohibited region is a region prohibited to be viewed by the viewer.

17. The information processing apparatus according to claim 1, wherein the CPU is further configured to calculate the index value related to display of the stereoscopic image content based on a crosstalk occurrence rate at each viewing position.

18. An information processing method, comprising:
calculating an index value related to display of stereoscopic image content including a stereoscopic image based on
a relative position of a viewer with respect to a position of an autostereoscopic display that displays the stereoscopic image, and
a display position of the stereoscopic image content with respect to the autostereoscopic display; and
controlling, based on the calculated index value, display processing performed by the autostereoscopic display.

19. A non-transitory computer-readable medium having stored thereon computer-executable instructions that, when executed by a processor, cause the processor to execute operations, the operations comprising:
calculating an index value related to display of stereoscopic image content including a stereoscopic image based on
a relative position of a viewer with respect to a position regarding a autostereoscopic display that displays the stereoscopic image, and
a display position of the stereoscopic image content with respect to the autostereoscopic display; and
controlling display processing of the autostereoscopic display based on the calculated index value.

* * * * *